US011490070B2

(12) United States Patent
Xue et al.

(10) Patent No.: US 11,490,070 B2
(45) Date of Patent: Nov. 1, 2022

(54) DARK FLASH PHOTOGRAPHY WITH A STEREO CAMERA

(71) Applicant: Google LLC, Mountain View, CA (US)

(72) Inventors: Tianfan Xue, Sunnyvale, CA (US); Jian Wang, Pittsburgh, PA (US); Jiawen Chen, Mountain View, CA (US); Jonathan Barron, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/322,216

(22) Filed: May 17, 2021

(65) Prior Publication Data
US 2021/0274151 A1 Sep. 2, 2021

Related U.S. Application Data

(63) Continuation of application No. 16/120,666, filed on Sep. 4, 2018, now Pat. No. 11,039,122.

(51) Int. Cl.
H04N 13/25 (2018.01)
H04N 13/254 (2018.01)
H04N 5/235 (2006.01)

(52) U.S. Cl.
CPC ........... *H04N 13/25* (2018.05); *H04N 5/2354* (2013.01); *H04N 13/254* (2018.05)

(58) Field of Classification Search
CPC .... H04N 13/25; H04N 5/2354; H04N 13/254; H04N 5/332; H04N 13/239;
(Continued)

(56) References Cited

U.S. PATENT DOCUMENTS 9,928,420 B2 3/2018 Kirk et al.
11,039,122 B2 6/2021 Xue et al.
(Continued)

FOREIGN PATENT DOCUMENTS

CN 102209245 A 10/2011
CN 104702832 A 6/2015
(Continued)

OTHER PUBLICATIONS

International Search Report and Written Opinion of International Application No. PCT/US2019/045208 dated Dec. 9, 2019.

*Primary Examiner* — Oschta I Montoya
(74) *Attorney, Agent, or Firm* — McDonnell Boehnen Hulbert & Berghoff LLP

(57) ABSTRACT

Scenes can be imaged under low-light conditions using flash photography. However, the flash can be irritating to individuals being photographed, especially when those individuals' eyes have adapted to the dark. Additionally, portions of images generated using a flash can appear washed-out or otherwise negatively affected by the flash. These issues can be addressed by using a flash at an invisible wavelength, e.g., an infrared and/or ultraviolet flash. At the same time a scene is being imaged, at the invisible wavelength of the invisible flash, the scene can also be imaged at visible wavelengths. This can include simultaneously using both a standard RGB camera and a modified visible-plus-invisible-wavelengths camera (e.g., an "IR-G-UV" camera). The visible and invisible image data can then be combined to generate an improved visible-light image of the scene, e.g., that approximates a visible light image of the scene, had the scene been illuminated during daytime light conditions.

17 Claims, 5 Drawing Sheets

(58) Field of Classification Search
CPC ........ H04N 13/257; G06T 2207/10024; G06T 2207/10048; G06T 2207/10152; G06T 2207/20084; G06T 2207/20221; G06T 5/50; G03B 42/00; G03B 15/05
See application file for complete search history.

(56) References Cited

U.S. PATENT DOCUMENTS

| | | |
|---|---|---|
| 2005/0179779 A1 | 8/2005 | Oochi et al. |
| 2007/0025717 A1 | 2/2007 | Raskar et al. |
| 2011/0242372 A1 | 10/2011 | Kosaka |
| 2011/0292216 A1 | 12/2011 | Fergus et al. |
| 2013/0266176 A1 | 10/2013 | Jain et al. |
| 2015/0256813 A1 | 9/2015 | Dal Mutto et al. |
| 2015/0381963 A1* | 12/2015 | Dal Mutto ............. H04N 5/265 348/46 |
| 2016/0330358 A1 | 11/2016 | Fergus et al. |
| 2017/0195654 A1 | 7/2017 | Powers et al. |
| 2018/0122144 A1 | 5/2018 | Hubo et al. |
| 2018/0295295 A1 | 10/2018 | Hicks et al. |
| 2019/0095721 A1* | 3/2019 | Ion ....................... G05D 1/0246 |
| 2020/0193570 A1* | 6/2020 | Aoki ....................... G06T 5/003 |

FOREIGN PATENT DOCUMENTS

| | | |
|---|---|---|
| CN | 104883500 A | 9/2015 |
| CN | 107566753 A | 1/2018 |
| CN | 108141547 A | 6/2018 |
| KR | 20040029950 A | 4/2004 |
| WO | 2010081010 A2 | 7/2010 |

* cited by examiner

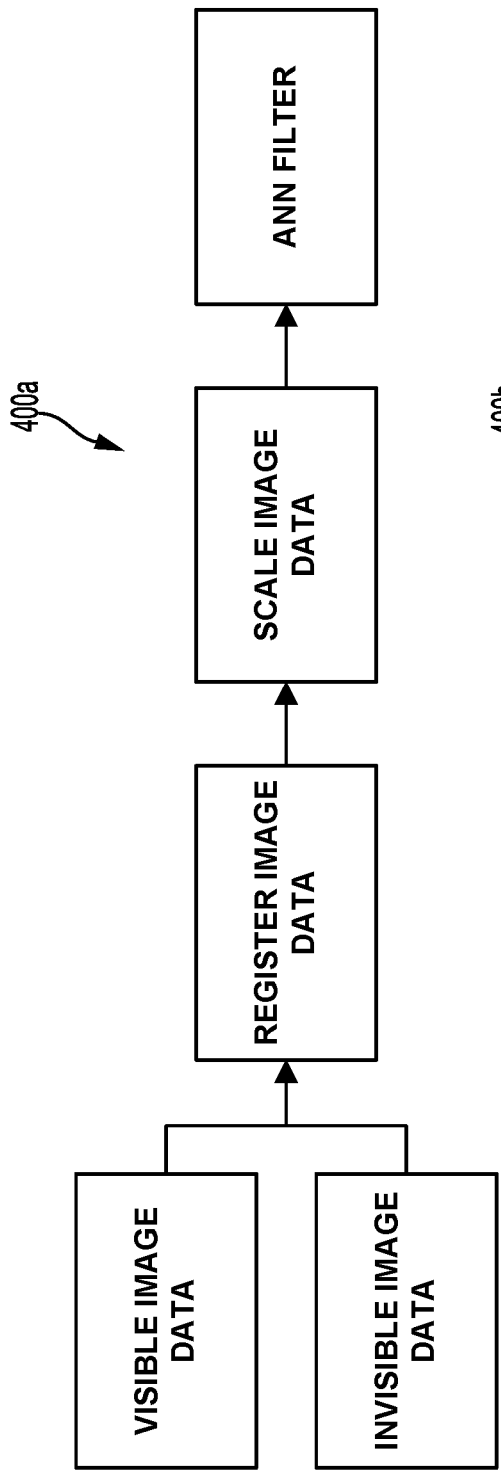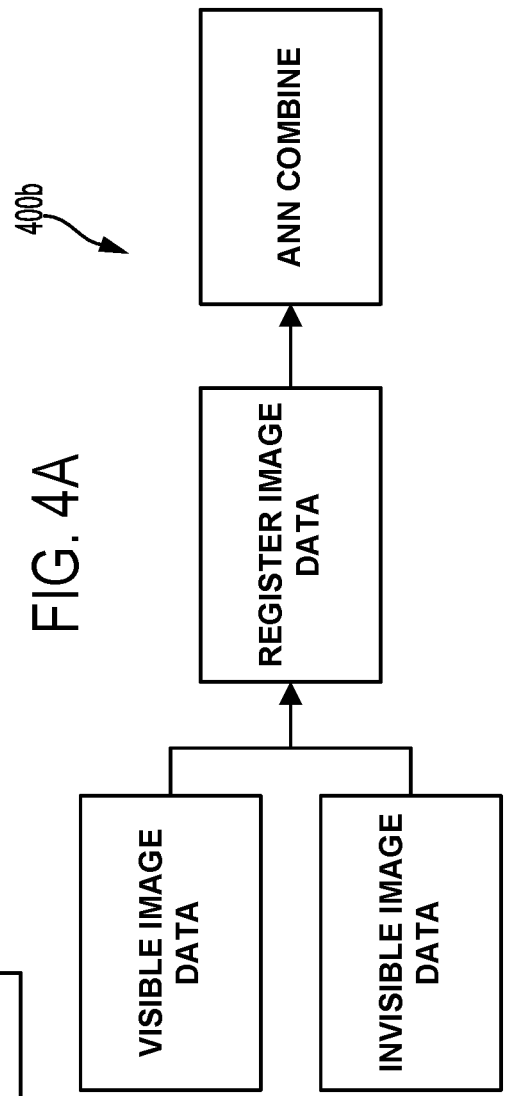

DARK FLASH PHOTOGRAPHY WITH A STEREO CAMERA

CROSS-REFERENCE TO RELATED APPLICATIONS

This application is a continuation of U.S. patent application Ser. No. 16/120,666, filed Sep. 4, 2018, which is incorporated herein by reference.

BACKGROUND

In low-light situations, photographs generated without supplemental illumination (e.g., a flash) can suffer from high noise or other negative effects. The use of a flash to momentarily illuminate a scene, in time with the imaging of the scene (e.g., by one or more cameras), can permit contents of the scene to be imaged more effectively. However, the use of a flash can cause irritation to humans and animals that are illuminated by the flash (e.g., by irritating their eyes, due to the eyes' having adapted to the lower illumination level absent the flash). Additionally, contents of the scene that are illuminated by the flash can appear washed-out, due to over-illumination by the flash.

Additionally or alternatively, an exposure time can be increased and/or multiple images could be taken and later computationally combined in order to overcome some of the limitations inherent in low-light photography. However, these methods may exhibit significant blur due to motion of objects within the imaged scene and/or due to motion of the imaging device (e.g., a camera, a cellphone) relative to the scene.

SUMMARY

An aspect of the present disclosure relates to a device including: (i) a first camera that is operable to generate green image data based on green light received by the first camera, blue image data based on blue light received by the first camera, and red image data based on red light received by the first camera; (ii) a second camera that is operable to generate first visible image data based on light at a first visible wavelength that is received by the second camera and first invisible image data based on light at a first invisible wavelength received by the second camera; (iii) a flash that is operable to emit light at the first invisible wavelength; and (iv) a controller that is operably coupled to the first camera, the second camera, and the flash and that includes at least one processor programmed to perform controller operations. The controller operations include: (a) operating the flash, during a first period of time, to illuminate a scene with light at the first invisible wavelength; (b) operating the first camera, during the first period of time, to generate a first image of the scene, where the first image includes information indicative of red, green, and blue light received from the scene; and (c) operating the second camera, during the first period of time, to generate a second image of the scene, where the second image includes information indicative of light received from the scene at the first visible wavelength and at the first invisible wavelength.

Another aspect of the present disclosure relates to a method including: (i) illuminating a scene with light at a first invisible wavelength during a first period of time; (ii) during the first period of time, obtaining image data for the scene, where the obtained image data includes information indicative of red, green, and blue light received from the scene and information indicative of light received from the scene at the first invisible wavelength; and (iii) using the obtained image data to generate an improved visible-light image of the scene.

Yet another aspect of the present disclosure relates to a device including: (i) a flash that is operable to emit light at a first invisible wavelength; (ii) one or more image sensors that are operable to generate green image data based on green light received by the image sensor, blue image data based on blue light received by the image sensor, red image data based on red light received by the image sensor, and first invisible image data based on light at the first invisible wavelength received by the image sensor; and (iii) a controller that is operably coupled to the flash and the one or more image sensors and that includes at least one processor programmed to perform controller operations. The controller operations include: (a) operating the flash, during a first period of time, to illuminate a scene with light at the first invisible wavelength; and (b) operating the one or more image sensors, during the first period of time, to generate image data for the scene, wherein the image data includes information indicative of red, green, and blue light received from the scene and information indicative of light received from the scene at the first invisible wavelength.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4A is a flowchart of a method, according to an example embodiment.

FIG. 4B is a flowchart of a method, according to an example embodiment.

DETAILED DESCRIPTION

Figure 1A:
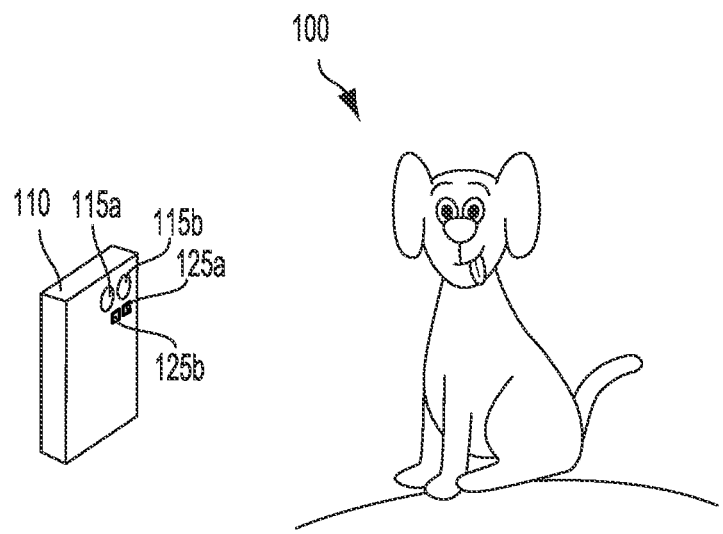
FIG. 1A depicts an example environment containing an example imaging device.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

The present disclosure recites throughout a variety of wavelengths and/or ranges of wavelengths. As used herein, "visible wavelength(s)" refers to any wavelength of light that is generally visible by the human eye, i.e., wavelengths between 380 nanometers and 800 nanometers. "Invisible wavelength(s)" refers to any wavelength of light that is generally invisible or marginally visible by the human eye, i.e., wavelengths below 420 nanometers and wavelengths above 700 nanometers. "Infrared wavelength(s)" refers to wavelengths between 700 nanometers and 1 millimeter, while "near infrared wavelength(s)" refers to wavelengths between 700 nanometers and 1400 nanometers. "Ultraviolet wavelength(s)" refers to wavelengths between 10 nanometers and 420 nanometers, while "near infrared wavelength(s)" refers to wavelengths between 300 nanometers and 420 nanometers. "Red wavelength(s)" refers to wavelengths between 500 nanometers and 750 nanometers, "green wavelength(s)" refers to wavelengths between 450 nanometers and 630 nanometers, and "blue wavelength(s)" refers to wavelengths between 400 nanometers and 500 nanometers.

I. Overview

Low light conditions can lead to difficulty in photography. While a flash can be used to illuminate a scene of interest, the resulting image can be washed-out and unnatural-looking, due to the flash only illuminating portions of the imaged scene. Additionally, the light from a flash can be irritating, particularly to people whose eyes have adapted to the low light levels that necessitated the flash. Additionally or alternatively, a longer exposure duration, or multiple short exposures, could be used to image a scene in order to reduce noise in the generated image. However, movement of objects within the scene and/or of the camera relative to the scene can cause blurring when the camera is operated in such a manner.

In order to alleviate these issues, invisible wavelengths of light (e.g., infrared, ultraviolet) can be used to illuminate a scene to be imaged. The invisible flash avoids irritating people in the scene while providing illumination to facilitate imaging the scene. Image information for the scene, at the invisible wavelength of the invisible flash, can then be used to augment or improve visible-light image information (e.g., red, green, and blue images) simultaneously taken of the scene. The invisible image information can include information about the structure of contents of the image (e.g., the size, shape, texture, and location of people, objects, or other contents within the scene) while the visible image information can provide information about the chroma or coloration of the contents of the image, as well as some information about the structure of the contents of the image. Additional invisible flashes, at respective additional invisible wavelengths, could be used to provide additional invisible image information for the scene.

The visible and invisible image information could be combined in a variety of ways in order to generate an improved image of the scene, e.g., an image that approximates an image of the scene had the scene been illuminated by daylight. This could be effected by, e.g., scaling the visible image information according to a magnitude and/or gradient present in the invisible image information and/or using the invisible image information to inform the phase and magnitude of the output image information while using the visible image information to inform the chrome of the output image (e.g., by applying a bilateral filter to the invisible image information to "colorize" the invisible image information according to the visible image information). In some examples, an artificial neural network (e.g., a convolutional neural network) could be used to combine the visible and invisible image information (e.g., to colorize the invisible image information based on the visible image information) and/or to "clean up" an already-combined image.

The visible and invisible image information for a scene could be acquired in a variety of ways. In some examples, a single camera or other image sensor could be configured to image visible light at multiple wavelengths (e.g., red, green, and blue wavelengths) and invisible light at one or more wavelengths (e.g., an infrared wavelength, a near infrared wavelength, an ultraviolet wavelength, and/or a near ultraviolet wavelength). In an embodiment, a camera could include a Bayer filter having green, red, blue, and invisible (e.g., infrared) filters disposed on respective sets of pixels. Additionally or alternatively, multiple cameras could be used to generate the visible and invisible image information. For example, a device could include a first camera configured to image multiple visible-light wavelengths (e.g., red, green, and blue wavelengths) and a second camera configured to image at least one visible-light wavelength corresponding to one of the wavelengths imaged by the first camera (e.g., a green wavelength) and at least one invisible wavelength (e.g., one or more of an infrared, near infrared, ultraviolet, and/or near ultraviolet wavelength(s)). The first and second cameras could be operated to image a scene concurrently (e.g., during the period of time when the scene is being illuminated by an invisible flash) and the resulting first and second images could be registered to each other (e.g., based on correspondences between the visible-light image information generated by both of the cameras) and the registered images could then be used to generate an improved image of the scene, as described herein.

It should be understood that the above embodiments, and other embodiments described herein, are provided for explanatory purposes, and are not intended to be limiting.

II. Example Image Sensors

As described herein, image information about a scene generated at one or more invisible wavelengths, while illuminating the scene at the one or more invisible wavelengths (e.g., using one or more flashes), can be used to improve a visible-light image taken of the scene. Such improvement can be related to statistical correlations between the magnitude, gradient, or other image information present at the invisible wavelength(s) for natural scenes and image information at visible wavelengths for those natural scenes. For example, the invisible-wavelength image(s) could provide relatively low-noise, high-contrast information about edges or other image phase information for a scene (e.g., the shapes, sizes, and location of objects, textures, or other contents of the scene), due in part to the illumination of the scene at corresponding invisible wavelengths. Contemporaneously-acquired visible-wavelength information could provide information about the visible-light chroma of the contents of the scene, and known relationships between the visible and invisible image contents of natural scenes could be used to combine the visible and invisible image information for the scene in order to generate an improved visible-light image of the scene (i.e., an image that accurately represents how the scene would have looked had it been illuminated by a flash, by sunlight, or by some other source of illumination).

A device (or system of devices) may be configured in a variety of ways to generate such imaging information (i.e., imaging information at a number of visible wavelengths and a number of invisible wavelengths) while illuminating a scene at one or more invisible (e.g., near infrared, infrared, ultraviolet, near ultraviolet) wavelengths. In some examples, the device could include a single hyperspectral camera component configured to generate image data at the specified visible and invisible wavelengths. In another example, the device could include a camera for each of the wavelengths to be imaged, coupled together with a beamsplitter or other optical elements such that each of the cameras receives light at a respective visible or invisible wavelength. In yet another example, the device could include a number of cameras, with each camera configured to image a respective set of visible and/or invisible wavelengths (e.g., a first camera configured to image red, green, and blue wavelengths, and a second camera configured to image one of the preceding visible wavelengths (e.g., green) and one or more invisible wavelengths).

Figure 1B:
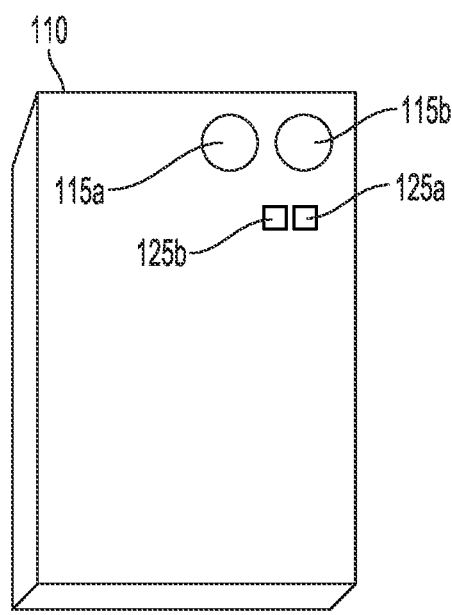
FIG. 1B depicts the example imaging device of FIG. 1A

FIGS. 1A and 1B illustrate an example device 110 configured to image a scene 100 according to the methods described herein. The device 110 could take the form of a cellphone, a tablet computer, a portable video recording device, a camera, or some other form factor. The device 110 includes a first camera 115a and a second camera 115b and a first flash 125a and a second flash 125b. The flashes 125a, 125b are configured to generate illumination at respective first and second invisible wavelengths (e.g., at an infrared wavelength and an ultraviolet wavelength, at two different infrared wavelengths). Alternatively, one of the flashes 125a, 125b could be configured to provide illumination at visible wavelengths (e.g., a white-light flash). The cameras are configured to generate image information for the scene 100 at respective sets of wavelengths. For example, the first camera 115a could generate image information at red, green, and blue wavelengths and the second camera 115b could generate image information at the green wavelength and at one or more invisible wavelengths corresponding to the wavelength(s) of invisible illumination generated by the flash(es) 125a, 125b.

The wavelengths detected by each of two (or more) cameras of a device could be specified to provide a variety of benefits. For example, one of the cameras could be a standard visible-light camera (e.g., an RGB camera) such that the system can operate in a normal visible-light mode. Additionally, any visible-plus-invisible image data generated using such a system could be used to generate visible-light images using standard low-light image processing techniques (e.g., by applying such image processing techniques to the visible-light image data generated using the visible-light camera).

Further, the use of off-the-shelf visible-light cameras can provide economies of scale. These economies of scale could also be accessed by modifying a visible-light camera (e.g., by adding and/or subtracting one or more wavelength-selective filters to/from such a camera) in order to operate the modified camera to detect image data for one or more invisible wavelengths of light. For example, an infrared filter could be removed from such a visible-light camera and/or a red filter could be added to such a camera such that the "red" pixels of such a modified camera could be operated to generate image data at an infrared wavelength. Additionally or alternatively, an ultraviolet filter could be removed from such a visible-light camera and/or a blue filter could be added to such a camera such that the "blue" pixels of such a modified camera could be operated to generate image data at an ultraviolet wavelength.

Figures 2, 3:
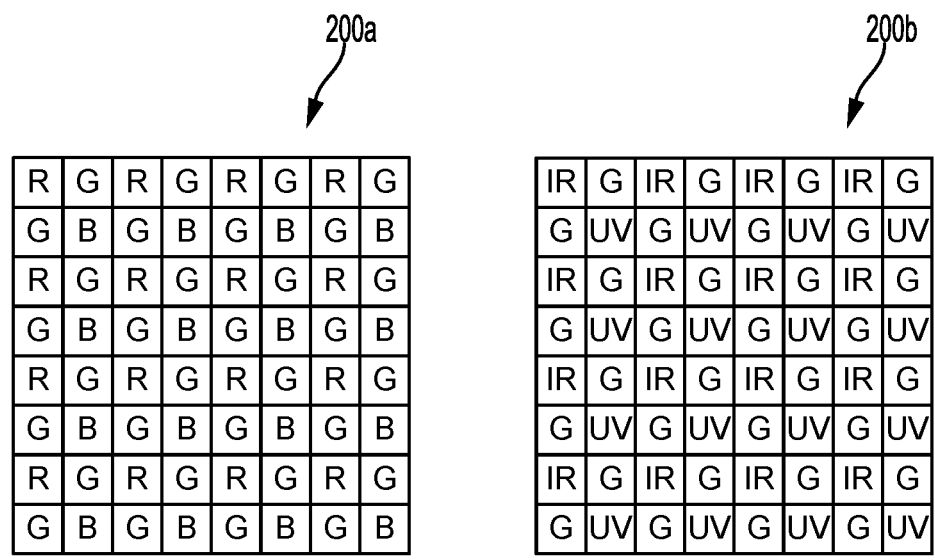
FIG. 2 depicts a schematic of elements of two example imaging sensors.
FIG. 3 depicts a schematic of elements of an example imaging sensor.

FIG. 2 illustrates an example arrangement of pixels of two cameras. The first camera (e.g., 115a) has a first pixel arrangement 200a that includes pixels sensitive to red ("R"), green ("G"), and blue ("B") wavelengths of light, respectively. This selective sensitivity could be effected, in the first camera, by disposing respectively sets of light filters on or otherwise proximate to the pixels of the first camera, such that light of the corresponding wavelength is permitted to reach each pixel. Additional light filters (e.g., a filter configured to block light at infrared wavelengths and/or a filter configured to block ultraviolet wavelengths) could be applied to light that is received by all of the pixels (e.g., such a filter could be applied at an aperture of the first camera) to improve the wavelength-specificity of each of the sets of pixels.

The second camera (e.g., 115b) has a second pixel arrangement 200b that includes pixels sensitive to a first visible wavelength (a green wavelength, "G"), and two invisible wavelengths (an infrared wavelength, "IR," and an ultraviolet wavelength, "UV"). This selective sensitivity could be effected, in the second camera, by disposing respectively sets of light filters on or otherwise proximate to the pixels of the second camera, such that light of the corresponding wavelength is permitted to reach each pixel. As noted above, the second camera could be an off-the-shelf visible-light camera that has been modified (e.g., by removal/additional of light filters to the aperture or other locations of the second camera) to provide the described visible and invisible image information. In such examples, the individual-pixel filters could permit passage of more light at visible wavelengths (e.g., more blue light than ultraviolet light to the "UV' pixels, more red light than infrared light to the "IR" pixels) that, in combination with additional filters (e.g., filters that block blue, red, or other visible wavelengths of light), render the corresponding pixels selectively sensitive to the corresponding invisible wavelengths of light.

The illustrated correspondence between the green pixels of the first and second patterns 200a, 200b could provide a variety of benefits. For example, image information generated, by each of the two cameras, for the green wavelength could be used to register the image information generated by cameras to each other (e.g., by warping the visible-wavelength image information to correspond to the invisible-wavelength image information). Additionally or alternatively, image information generated, by each of the two cameras, for the green wavelength could be used to generate a depth map for a scene imaged using the two cameras (e.g., based on a parallax between the apertures of the two cameras).

Note that the illustrated presence of green pixels in both the first and second patterns 200a, 200b is intended as non-limiting example of a correspondence between a set of pixels of a first camera that is operable to generate image information for a number of additional visible wavelengths and a second camera that is operable to generate image information for a number of invisible wavelengths. The visible-wavelength pixels of such a second camera could correspond, with respect to wavelength, to any of the wavelengths of visible light that the first camera is capable of imaging (e.g., a red wavelength, a blue wavelength).

Alternatively, a single camera or other image sensor component of a system as described herein could be capable of generating image information at a number of visible wavelengths (e.g., red, green, and blue wavelengths) as well as image information at one or more invisible wavelengths (e.g., an infrared wavelength, two different infrared wavelengths, an infrared wavelength and an ultraviolet wavelength). Such a camera or other image sensor could be configured such that sets of pixels of the image sensor are selectively sensitive to respective different wavelengths of light (e.g., by disposing respective sets of filters on or proximate to the sets of pixels). FIG. 3 illustrates an example arrangement of pixels of such an image sensor. The pixel arrangement includes pixels sensitive to red ("R"), green ("G"), blue ("B"), an infrared ("IR") wavelengths of light, respectively. Alternative patterns of wavelength-selective pixels are possible. Such patterns could include additional sets of pixels that are selectively sensitive to light at corresponding additional visible and/or invisible wavelengths of light. Additionally or alternatively, such patterns could include additional pixels, per repeated tile of the pattern, that are sensitive to the same wavelength(s) of visible light. For example, a single repeated tile of such a pattern of pixels could include three pixels sensitive to green wavelengths of light, two pixels sensitive to red wavelengths of light, two pixels sensitive to blue wavelengths of light, one pixel sensitive to infrared wavelengths of light, and one pixel sensitive to ultraviolet wavelengths of light. Such additional visible-wavelength pixels could be provided, e.g., in order to reduce a noise level at which visible-light chroma is detected for an image of a scene.

III. Example Visible Image Generation

Image information generated as described herein for a scene, that includes low-light visible-wavelength image information about the scene as well as image information at one or more invisible wavelengths for the scene while the scene is illuminated (e.g., by a flash) at the one or more invisible wavelengths, can be used in a variety of ways to generate a visible-light image for the scene that is improved relative to the visible-wavelength image information detected from the scene. Such an improved visible-light image could be improved relative to the detected visible-light image with respect to a variety of image properties, e.g., an overall noise level of the image, a contrast or sharpness of the image, an accuracy of the image with respect to edges, textures, or other sharp contents of the image, with respect to aesthetic considerations, or with respect to some other metric of interest.

In some examples, the visible-wavelength image information and the invisible-wavelength image information could be combined, e.g., by applying the sets of image information to an artificial neural network (e.g., a convolutional neural network), using a bilateral filter (e.g., with correspondence to gradients or other edge- or image-phase-related information in the invisible-wavelength image information as one of the terms of the cost function and correspondence to the regional-average chroma from the visible-wavelength image information as the other term of the cost function), or some other method. Additionally or alternatively, one of the sets of image information (e.g., the visible-light image information) could be used to scale, augment, or otherwise modify the other set of image information (e.g., the invisible-light image information) according to known statistical relationships between the optical properties of contents of natural scenes at the visible and invisible wavelengths.

An example of such an image processing flow 400a is depicted in FIG. 4A. The input information includes visible-wavelength image information ("VISIBLE IMAGE DATA") generated, e.g., by a camera sensitive to red, green, and blue wavelengths and invisible-wavelength image ("INVISIBLE IMAGE DATA") generated, e.g., by a camera sensitive to one or more invisible wavelengths of light.

The first step of the image processing flow is to register the visible and invisible image information together ("REGISTER IMAGE DATA") such that the images correspond. This can include, in examples wherein the camera or other image sensor that generated the invisible image information also generated visible-wavelength image information, determining a correspondence between the visible-wavelength image information and additional visible-wavelength image information generated using the same image sensor as that used to generate the invisible-wavelength image information. For example, determining a correspondence between a green channel of the visible-wavelength image information (generated, e.g., by the first camera 115a) and a green channel generated by a camera that is also used to generate the invisible-wavelength image information (e.g., the second camera 115b). The determined correspondence can then be used to warp one of the sets of image information to the other, to warp them toward some intermediary structure, or to otherwise register the visible and invisible image information to each other. In some examples, the visible image information can be warped or otherwise registered to correspond to the invisible image information due to the likely higher image contrast, lower image noise, or other properties of the invisible image information due to the invisible image information having been generated while the scene is illuminated with light at a corresponding invisible wavelength(s) (e.g., by a flash that emits light at such invisible wavelength(s)).

Note that, in examples wherein the visible and invisible image information are generated by a single camera or are otherwise generated via a process such that the visible and invisible image information are already registered to each other, the image registration step may be omitted.

The registered visible-light image information is then used to scale the invisible-light image information and/or the invisible-light image information is used to scale the visible-light image information to generate scaled visible-light image. This scaled visible-light image represents an image of a scene that is improved relative to the visible light image information alone (e.g., with respect to image noise level, contrast, sharpness, preservation of edges, textures, or other sharp features within the image). This scaling can take into account the fact that the visible-light image information likely has superior information about the visible-light chroma of contents of the scene while the invisible-light image information, having the benefit of illumination by an invisible-wavelength flash, is likely to have superior information regarding the shape, location, texture, edges, or other image-phase-related contents of an image of the scene.

Accordingly, scaling the image data can include scaling one or both of the magnitude or gradient of the invisible image information according to each wavelength of the visible image information. This scaling can include using a bilateral filter to combine the invisible image information and the visible image information. For example, the bilateral filter could be applied using a cost function that includes a first term related to sharp features (e.g., edges, local self-similarity) within the magnitude and/or gradient of the invisible image information and a second term related to the chroma of the visible image information (e.g., a regional average chroma, to compensate for noise in the visible image information).

The scaled visible-light image can then be used, e.g., by being presented on a screen of a cellphone or saved to an online photo album. Additionally or alternatively, post-processing could be applied to further improve the scaled visible-light image. For example, a de-noising process, a contrast-enhancement, or some other filtering could be applied to the scaled visible-light image. In some examples, an artificial neural network (ANN) (e.g., a convolutional artificial neural network) could be applied to post-process the scaled visible-light image (shown in FIG. 4A as "ANN FILTER"). Such an artificial neural network filter could be trained using a training data set that includes very long-exposure visible-light images of a variety of natural scenes as the "ground truth" outputs and corresponding sets of low-light visible light images of the scenes taken contemporaneously with invisible-flash-illuminated invisible light images of the scenes. The preceding image processing steps (e.g., image registration, scaling) could then be applied to the sets of low-light visible light images and invisible images in order to generate the input images for training the artificial neural network.

Alternative image processing flows are possible in order to generate improved visible light images based on sets of low-light visible image information and flash-illuminated invisible image information. For example, the visible image information and the invisible image information could be combined directly, e.g., by being applied to an artificial neural network trained to perform such a task. This is illustrated in FIG. 4B, which shows an example of such an image processing flow 400b.

The input information includes visible-wavelength image information ("VISIBLE IMAGE DATA") generated, e.g., by a camera sensitive to red, green, and blue wavelengths and invisible-wavelength image ("INVISIBLE IMAGE DATA") generated, e.g., by a camera sensitive to one or more invisible wavelengths of light. The image processing flow 400b includes registering the visible and invisible image information together ("REGISTER IMAGE DATA") such that the images correspond. In examples wherein the image data is already registered (e.g., due to having been generated by a single camera or other image sensing component), this step may be omitted. The registered visible and invisible image information is then combined, by the artificial neural network ("ANN COMBINE") to generate an improved visible light image.

Such an artificial neural network filter could be trained using a training data set that includes very long-exposure visible-light images of a variety of natural scenes as the "ground truth" outputs and corresponding sets of low-light visible light images of the scenes taken contemporaneously with invisible-flash-illuminated invisible light images of the scenes. The preceding image processing steps (e.g., image registration) could then be applied to the sets of low-light visible light images and invisible images in order to generate the input images for training the artificial neural network.

IV. Example Systems

Figure 5:
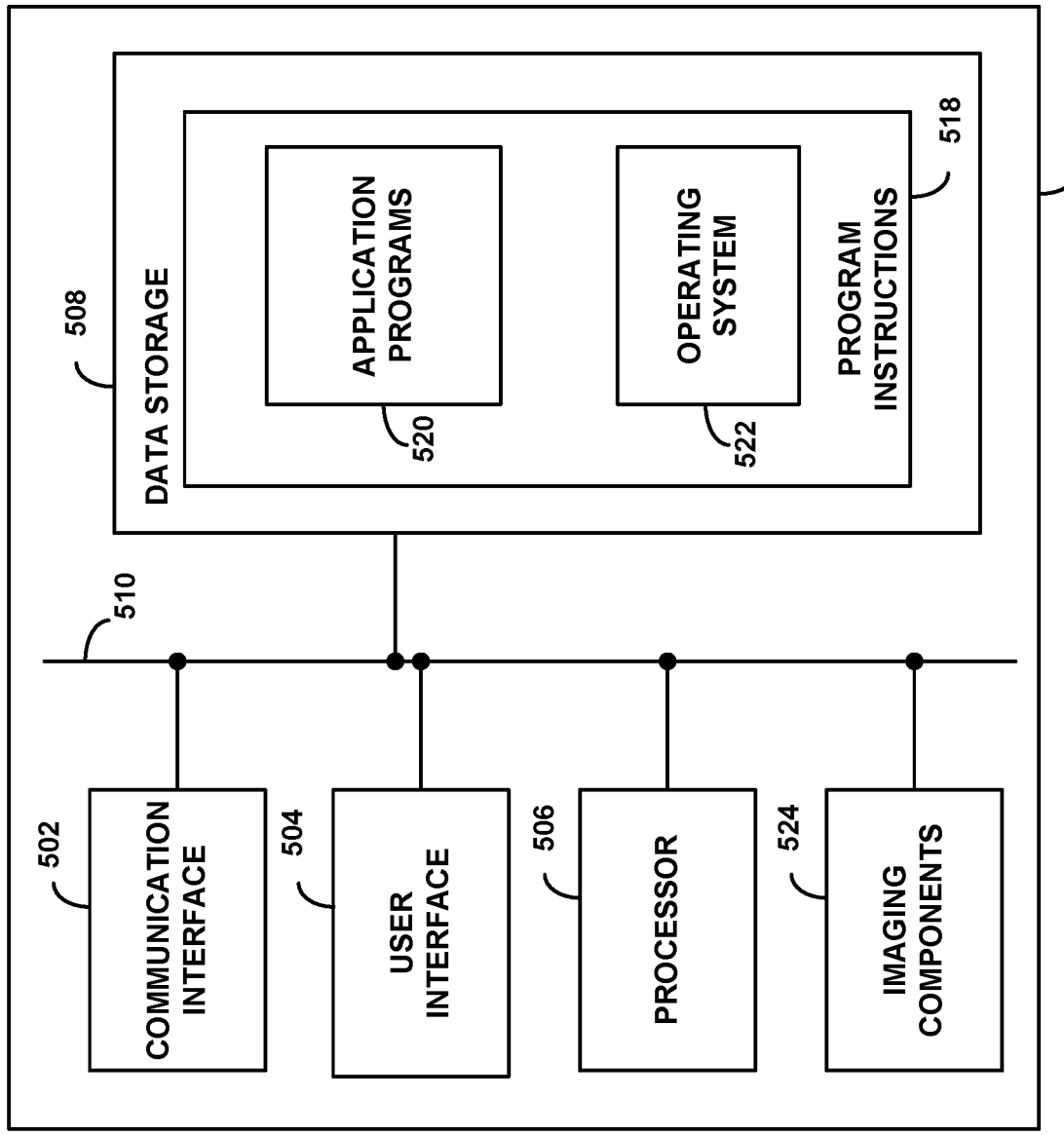
FIG. 5 is a simplified block diagram showing some of the components of an example system.

Computational functions (e.g., functions to obtain visible and/or invisible image information for a scene, to combine or otherwise image-process such image information to generate improved visible-light images of a scene, to generate a depth map for a scene)) described herein may be performed by one or more computing systems. Such a computing system may be integrated into or take the form of a computing device, such as a mobile phone, tablet computer, laptop computer, server, home automation element, stand-alone video capture and processing device, cloud computing network, and/or programmable logic controller. For purposes of example, FIG. 5 is a simplified block diagram showing some of the components of an example computing device 500 that may include imaging components 524. Imaging components 524 may include one or more cameras or other types of image sensing elements (e.g., Fourier image capture arrays). Alternatively, an example computing device may lack such components and receive image information via some other means (e.g., via the internet or some other network or other communications interface).

By way of example and without limitation, computing device 500 may be a cellular mobile telephone (e.g., a smartphone), a video camera, a computer (such as a desktop, notebook, tablet, or handheld computer), a personal digital assistant (PDA), a wearable computing device, or some other type of device that may be equipped with imaging and/or image processing capabilities. It should be understood that computing device 500 may represent a physical image recording device, a particular physical hardware platform on which an image capture application operates in software, or other combinations of hardware and software that are configured to carry out image capture and/or image processing functions.

As shown in FIG. 5, computing device 500 may include a communication interface 502, a user interface 504, a processor 506, data storage 508, and imaging components 524, all of which may be communicatively linked together by a system bus, network, or other connection mechanism 510.

Communication interface 502 may function to allow computing device 500 to communicate, using analog or digital modulation of electric, magnetic, electromagnetic, optical, or other signals, with other devices, access networks, and/or transport networks. Thus, communication interface 502 may facilitate circuit-switched and/or packet-switched communication, such as plain old telephone service (POTS) communication and/or Internet protocol (IP) or other packetized communication. For instance, communication interface 502 may include a chipset and antenna arranged for wireless communication with a radio access network or an access point. Also, communication interface 502 may take the form of or include a wireline interface, such as an Ethernet, Universal Serial Bus (USB), or High-Definition Multimedia Interface (HDMI) port. Communication interface 502 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 502. Furthermore, communication interface 502 may comprise multiple physical communication interfaces (e.g., a Wifi interface, a BLUETOOTH® interface, and a wide-area wireless interface).

In some embodiments, communication interface 502 may function to allow computing device 500 to communicate, with other devices, remote servers, access networks, and/or transport networks. For example, the communication interface 502 may function to transmit and/or receive an indication of image information, to transmit an indication of an image that has be generated using the methods described herein, or some other information. For example, the computing device 500 could be a cellphone, digital camera, or other image capturing device and the remote system could be a computer, server, cloud computing system, or other system configured to perform the methods described herein.

User interface 504 may function to allow computing device 500 to interact with a user, for example to receive input from and/or to provide output to the user. Thus, user interface 504 may include input components such as a keypad, keyboard, touch-sensitive or presence-sensitive panel, computer mouse, trackball, joystick, microphone, and so on. User interface 504 may also include one or more output components such as a display screen which, for example, may be combined with a presence-sensitive panel. The display screen may be based on CRT, LCD, and/or LED technologies, or other technologies now known or later developed. User interface 504 may also be configured to generate audible output(s), via a speaker, speaker jack, audio output port, audio output device, earphones, and/or other similar devices.

In some embodiments, user interface 504 may include a display that serves to present video or other images to a user (e.g., images generated using the imaging components 524 and/or generated according to the methods described herein). Additionally, user interface 504 may include one or more buttons, switches, knobs, and/or dials that facilitate the configuration and operation of the imaging components 524, the capturing of images and/or video streams using the imaging components 524, or to configure some other operation of the computing device 500. It may be possible that some or all of these buttons, switches, knobs, and/or dials are implemented as functions on a touch- or presence-sensitive panel.

Processor 506 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image registration and/or scaling, and neural network computation, among other applications or functions. Data storage 508 may include one or more volatile and/or non-volatile storage components, such as magnetic, optical, flash, or organic storage, and may be integrated in whole or in part with processor 506. Data storage 508 may include removable and/or non-removable components.

Processor 506 may be capable of executing program instructions 518 (e.g., compiled or non-compiled program logic and/or machine code) stored in data storage 508 to carry out the various functions described herein. Therefore, data storage 508 may include a non-transitory computer-readable medium, having stored thereon program instructions that, upon execution by computing device 500, cause computing device 500 to carry out any of the methods, processes, or functions disclosed in this specification and/or the accompanying drawings.

By way of example, program instructions 518 may include an operating system 522 (e.g., an operating system kernel, device driver(s), and/or other modules) and one or more application programs 520 (e.g., image and/or video recording functions, image processing) installed on computing device 500.

Application programs 520 may take the form of "apps" that could be downloadable to computing device 500 through one or more online application stores or application markets (via, e.g., the communication interface 502). However, application programs can also be installed on computing device 500 in other ways, such as via a web browser or through a physical interface (e.g., a USB port) of the computing device 500.

In some examples, portions of the methods described herein could be performed by different devices, according to an application. For example, different devices of a system could have different amounts of computational resources (e.g., memory, processor cycles) and different information bandwidths for communication between the devices. For example, a first device could be a cellphone or other audiovisual capture device that could transmit an image and/or video stream to another device or server that has the necessary computational resources to perform the methods described herein to the transmitted image information. Different portions of the methods described herein could be apportioned according to such considerations.

V. Example Methods

Figure 6:
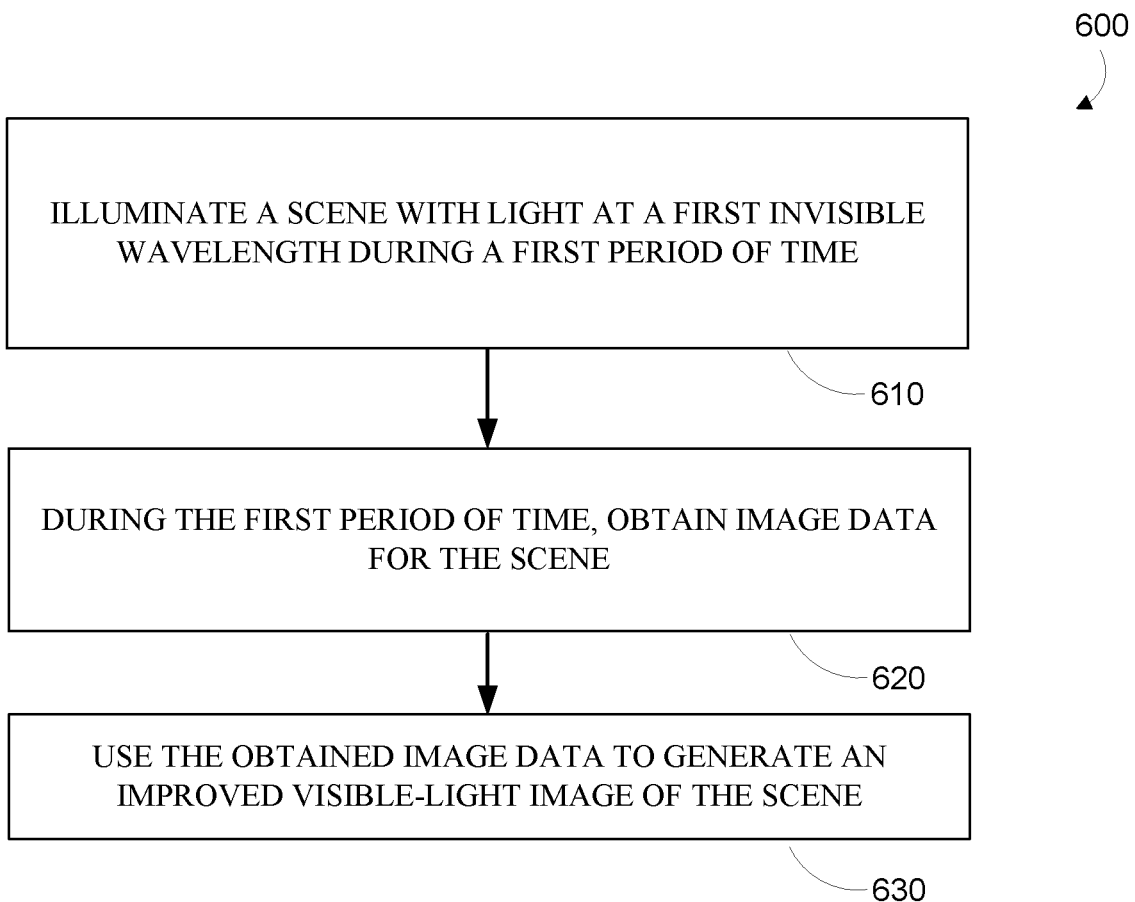
FIG. 6 is a flowchart of a method, according to an example embodiment.

FIG. 6 is a flowchart of a method 600 for generating visible light images of a scene based on low-light visible image information detected from the scene (e.g., generated by an RGB visible light camera) and flash assisted invisible image information detected from the scene (e.g., generated by an additional camera that is sensitive to both the invisible wavelengths of the invisible flash as well as one or more visible wavelengths to facilitate image registration with the visible image information) that are improved relative to the acquired visible-wavelength image information detected from the scene with respect to noise level, contrast, sharpness, accuracy of representation of the contents of the scene, or some other measure of image quality. The method 600 includes illuminating a scene with light at a first invisible wavelength during a first period of time (610). This can include operating a flash to generate illumination at the first invisible wavelength. Additional illumination, at additional invisible wavelengths, may also be generated during the first period of time.

The method 600 additionally includes, during the first period of time, obtaining image data for the scene (620). The obtained image data includes information indicative of red, green, and blue light received from the scene and information indicative of light received from the scene at the first invisible wavelength. The image data can be obtained by operating a single camera or other image sensor component to generate the image data. Additionally or alternatively, multiple cameras could be operated to generate the image data. For example, a first camera could be operated to generate the red, green, and blue image data (e.g., the first camera is an RGB camera) while a second camera could be operated to generate the invisible wavelength image data, as well as additional visible-light image data to facilitate registration of the red, green, and blue image data with the invisible wavelength image data. Image data could be generated for additional invisible wavelengths (e.g., for an infrared wavelength and an ultraviolet wavelength, for two different infrared wavelengths).

The method 600 additionally includes using the obtained image data to generate an improved visible-light image of the scene (630). This can include performing image registration to register the visible and invisible image information to each another. This can include using an artificial neural network, a bilateral filter, or some other method to combine the visible and invisible image information. This can include scaling one or the other of the visible and invisible image information based on the opposite image information. This can include applying an artificial neural network, a filter, or some other image processing technique to post-process the improved visible-light image of the scene.

The method 600 could include additional elements or features. For example, the visible-wavelength image information generated in the process of generating the invisible-wavelength image information could be used, in combination with corresponding-wavelength image information within the red, green, and blue image data, to generate a depth map for the scene.

VI. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

VII. Enumerated Example Embodiments

Embodiments of the present disclosure may thus relate to one of the enumerated example embodiments (EEEs) listed below. It will be appreciated that features indicated with respect to one EEE can be combined with other EEEs. In particular, it will be appreciated that features of EEEs 1 to 10 can be implemented in the context of EEEs 18 to 21.

EEE 1 is a device comprising: a first camera, wherein the first camera is operable to generate green image data based on green light received by the first camera, blue image data based on blue light received by the first camera, and red image data based on red light received by the first camera; a second camera, wherein the second camera is operable to generate first visible image data based on light at a first visible wavelength that is received by the second camera and first invisible image data based on light at a first invisible wavelength received by the second camera; a flash, wherein the flash is operable to emit light at the first invisible wavelength; and a controller. The controller is operably coupled to the first camera, the second camera, and the flash. The controller comprises at least one processor programmed to perform controller operations comprising: operating the flash, during a first period of time, to illuminate a scene with light at the first invisible wavelength; operating the first camera, during the first period of time, to generate a first image of the scene, wherein the first image comprises information indicative of red, green, and blue light received from the scene; and operating the second camera, during the first period of time, to generate a second image of the scene, wherein the second image comprises information indicative of light received from the scene at the first visible wavelength and at the first invisible wavelength.

EEE 2 is the device of EEE 1, further comprising: an additional flash, wherein the additional flash is operable to emit light at a second invisible wavelength, wherein the second camera is further operable to generate second invisible image data based on light at the second invisible wavelength that is received by the second camera, and wherein the controller operations further comprise: operating the additional flash, during the first period of time, to illuminate the scene with light at the second invisible wavelength, wherein the second image additionally comprises information indicative of light received from the scene at the second invisible wavelength.

EEE 3 is the device of EEE 2, wherein the first invisible wavelength is a first infrared wavelength and wherein the second invisible wavelength is a second infrared wavelength that differs from the first infrared wavelength.

EEE 4 is the device of EEE 2, wherein the first invisible wavelength is a first infrared wavelength and wherein the second invisible wavelength is a first ultraviolet wavelength.

EEE 5 is device of any one of EEE 1 to EEE 4, wherein the controller operations further comprise: using the first and second images to generate an improved visible-light image of the scene.

EEE 6 is the device of EEE 5, wherein using the first and second images to generate an improved visible-light image of the scene comprises: determining a correspondence between the information, of the second image, indicative of light received from the scene at the first visible wavelength and the information, of the first image, indicative of at least one of the red, green, or blue light received from the scene;

and based on the determined correspondence, registering the first image to the second image to generate a registered visible-light image.

EEE 7 is the device of EEE 6, wherein using the first and second images to generate an improved visible-light image of the scene further comprises: generating a scaled registered visible-light image by scaling at least one of a magnitude or a gradient of the information, of the second image, indicative of light received from the scene at the first invisible wavelength based on the registered visible-light image.

EEE 8 is the device of EEE 7, wherein using the first and second images to generate an improved visible-light image of the scene further comprises: using a convolutional neural network to filter the scaled registered visible-light image.

EEE 9 is the device of any one of EEE 1 to EEE 8, wherein the first visible wavelength is a green wavelength.

EEE 10 is the device of any one of EEE 1 to EEE 9, wherein the controller operations further comprise: generating, based on the first and second images, a depth map for the scene.

EEE 11 is a method comprising: illuminating a scene with light at a first invisible wavelength during a first period of time; during the first period of time, obtaining image data for the scene, wherein the obtained image data comprises information indicative of red, green, and blue light received from the scene and information indicative of light received from the scene at the first invisible wavelength; and using the obtained image data to generate an improved visible-light image of the scene.

EEE 12 is the method of EEE 11, wherein using the obtained image data to generate an improved visible-light image of the scene further comprises: generating a scaled visible-light image by scaling at least one of a magnitude or a gradient of the information indicative of light received from the scene at the first invisible wavelength based on the information indicative of red, green, and blue light received from the scene; and using a convolutional neural network to filter the scaled visible-light image.

EEE 13 is the method of EEE 11 or EEE 12, wherein obtaining image data for the scene during the first period of time comprises: operating a first camera, during the first period of time, to generate a first image of the scene, wherein the first image comprises information indicative of red, green, and blue light received from the scene; and operating a second camera, during the first period of time, to generate a second image of the scene, wherein the second image comprises information indicative of light received from the scene at at least one visible wavelength and at the first invisible wavelength; wherein using the obtained image data to generate an improved visible-light image of the scene comprises: determining a correspondence between the information indicative of light received from the scene at the at least one first visible wavelength and the information indicative of at least one of the red, green, or blue light received from the scene; and based on the determined correspondence, registering the first image to the second image to generate a registered visible-light image.

EEE 14 is the method of EEE 13, wherein using the obtained image data to generate an improved visible-light image of the scene further comprises: generating a scaled registered visible-light image by scaling at least one of a magnitude or a gradient of the information indicative of light received from the scene at the first invisible wavelength based on the registered visible-light image.

EEE 15 is the method of EEE 14, wherein using the obtained image data to generate an improved visible-light image of the scene further comprises: using a convolutional neural network to filter the scaled registered visible-light image.

EEE 16 is the method of EEE 14 or EEE 15, wherein generating a scaled registered visible-light image by scaling at least one of a magnitude or a gradient of the information indicative of light received from the scene at the first invisible wavelength based on the registered visible-light image comprises using a bilateral filter to combine the registered visible-light image and the at least one of a magnitude or a gradient of the information indicative of light received from the scene at the first invisible wavelength.

EEE 17 is the method of any one of EEE 11 to EEE 16, further comprising: operating an additional flash, during the first period of time, to illuminate the scene with light at a second invisible wavelength, wherein the obtained image data additionally comprises information indicative of light received from the scene at the second invisible wavelength.

EEE 18 is a device comprising: a flash, wherein the flash is operable to emit light at a first invisible wavelength; one or more image sensors, wherein the one or more image sensors are operable to generate green image data based on green light received by the image sensor, blue image data based on blue light received by the image sensor, red image data based on red light received by the image sensor, and first invisible image data based on light at the first invisible wavelength received by the image sensor; and a controller, wherein the controller is operably coupled to the flash and the one or more image sensors. The controller comprises at least one processor programmed to perform controller operations comprising: operating the flash, during a first period of time, to illuminate a scene with light at the first invisible wavelength; and operating the one or more image sensors, during the first period of time, to generate image data for the scene, wherein the image data comprises information indicative of red, green, and blue light received from the scene and information indicative of light received from the scene at the first invisible wavelength.

EEE 19 is the device of EEE 18, wherein the image sensor comprises a first camera that is operable to generate green image data based on green light received by the first camera, blue image data based on blue light received by the first camera, red image data based on red light received by the first camera, and first invisible image data based on light at the first invisible wavelength received by the first camera.

EEE 20 is the device of EEE 18 or EEE 19, further comprising: an additional flash, wherein the additional flash is operable to emit light at a second invisible wavelength, wherein the image sensor is further operable to generate second invisible image data based on light at the second invisible wavelength that is received by the image sensor, and wherein the controller operations further comprise: operating the additional flash, during the first period of time, to illuminate the scene with light at the second invisible wavelength, wherein the generated image data additionally comprises information indicative of light received from the scene at the second invisible wavelength.

EEE 21 is the device of any one of EEE 18 to EEE 20, wherein the one or more first image sensors comprises: a first camera, wherein the first camera is operable to generate green image data based on green light received by the first camera, blue image data based on blue light received by the first camera, and red image data based on red light received by the first camera; and a second camera, wherein the second camera is operable to generate first visible image data based on light at a first visible wavelength that is received by the second camera and first invisible image data based on light at a first invisible wavelength received by the second camera; wherein operating the one or more image sensors comprises: operating the first camera, during the first period of time, to generate a first image of the scene, wherein the first image comprises information indicative of red, green, and blue light received from the scene; and operating the second camera, during the first period of time, to generate a second image of the scene, wherein the second image comprises information indicative of light received from the scene at the first visible wavelength and at the first invisible wavelength.

EEE 22 is a computer-readable medium, having stored thereon program instructions that, upon execution by a computing device, cause the computing device to perform the method of any of EEEs 11-17.

EEE 23 is a device comprising a controller, wherein the controller is programmed to perform the method of any of EEEs 11-17.

We claim:

1. A device comprising:
   a first camera;
   a second camera; and
   a controller operably coupled to the first camera and the second camera, wherein the controller comprises at least one processor programmed to perform controller operations comprising:
   simultaneously operating:
      the first camera to generate a visible light image of a scene based on light at a visible wavelength; and
      the second camera to generate an invisible light image of the scene based on light at an invisible wavelength; and
   applying visible image information and invisible image information to an artificial neural network to generate an enhanced visible light image, the visible image information associated with the visible light image, and the invisible image information associated with the invisible light image, wherein the artificial neural network is trained using a training data set that comprises:
      long-exposure visible light images of a plurality of natural scenes;
      low-light visible light images of the plurality of natural scenes; and
      invisible-flash-illuminated invisible light images of the plurality of natural scenes that are taken contemporaneously with the low-light visible light images.

2. The device of claim 1, wherein the long-exposure visible light images are ground truth outputs of the training data set.

3. The device of claim 1, wherein the artificial neural network comprises a convolutional artificial neural network.

4. The device of claim 1, wherein the controller operations further comprise operating a flash to illuminate the scene with light at the invisible wavelength during a simultaneous capture of the visible light image and the invisible light image.

5. The device of claim 1, wherein the invisible wavelength comprises an infrared wavelength.

6. The device of claim 1, wherein the invisible wavelength comprises an ultraviolet wavelength.

7. The device of claim 1, wherein the invisible image information comprises structural information of content in the invisible light image.

8. The device of claim 7, wherein the structural information comprises at least one of a size of the content, a shape of the content, a texture of a content, or a location of the content.

9. The device of claim 1, wherein the visible image information comprises coloration information of content in the visible light image.

10. A method comprising:
    operating, at a controller, a first camera to generate a visible light image of a scene based on light at a visible wavelength;
    operating a second camera to generate an invisible light image of the scene based on light at an invisible wavelength, the second camera and the first camera operating simultaneously; and
    applying visible image information and invisible image information to an artificial neural network to generate an enhanced visible light image, the visible image information associated with the visible light image, and the invisible image information associated with the invisible light image, wherein the artificial neural network is trained using a training data set that comprises:
       long-exposure visible light images of a plurality of natural scenes;
       low-light visible light images of the plurality of natural scenes; and
       invisible-flash-illuminated invisible light images of the plurality of natural scenes that are taken contemporaneously with the low-light visible light images.

11. The method of claim 10, wherein the long-exposure visible light images are ground truth outputs of the training data set.

12. The method of claim 10, wherein the artificial neural network comprises a convolutional artificial neural network.

13. The method of claim 10, further comprising operating a flash to illuminate the scene with light at the invisible wavelength during a simultaneous capture of the visible light image and the invisible light image.

14. The method of claim 10, wherein the invisible wavelength comprises an infrared wavelength or an ultraviolet wavelength.

15. A device comprising:
    a controller comprising at least one processor programmed to perform controller operations comprising:
    simultaneously operating:
       a first camera to generate a visible light image of a scene based on light at a visible wavelength; and
       a second camera to generate an invisible light image of the scene based on light at an invisible wavelength; and
    applying visible image information and invisible image information to an artificial neural network to generate an enhanced visible light image, the visible image information associated with the visible light image, and the invisible image information associated with the invisible light image, wherein the artificial neural network is trained using a training data set that comprises:
       long-exposure visible light images of a plurality of natural scenes;
       low-light visible light images of the plurality of natural scenes; and
       invisible-flash-illuminated invisible light images of the plurality of natural scenes that are taken contemporaneously with the low-light visible light images.

16. The device of claim 15, wherein the long-exposure visible light images are ground truth outputs of the training data set.

17. The device of claim 15, wherein the artificial neural network comprises a convolutional artificial neural network.

\* \* \* \* \*